United States Patent [19]
Clarke et al.

[11] Patent Number: 5,736,723
[45] Date of Patent: Apr. 7, 1998

[54] METHOD AND APPARATUS FOR IDENTIFYING THE ORIENTATION OF A DOT MATRIX CODE MARKING OF AN ARTICLE

[75] Inventors: Michael A. N. Clarke; Christopher R. Booth, both of Derby, England

[73] Assignee: Rolls-Polce plc, London, England

[21] Appl. No.: 545,704

[22] PCT Filed: Mar. 16, 1995

[86] PCT No.: PCT/GB95/00572

§ 371 Date: Nov. 3, 1995

§ 102(e) Date: Nov. 3, 1995

[87] PCT Pub. No.: WO95/26010

PCT Pub. Date: Sep. 28, 1995

[30] Foreign Application Priority Data

Mar. 18, 1994 [GB] United Kingdom ............... 9405337

[51] Int. Cl.⁶ .......................................... G06K 7/10
[52] U.S. Cl. ........................ 235/456; 235/462; 382/189
[58] Field of Search ............................... 235/494, 487, 235/462, 456; 382/170, 289

[56] References Cited

U.S. PATENT DOCUMENTS

| | | | |
|---|---|---|---|
| 4,263,504 | 4/1981 | Thomas | 235/494 |
| 4,613,942 | 9/1986 | Chen | 235/494 |
| 4,901,359 | 2/1990 | Bruder | 235/494 |
| 4,924,078 | 5/1990 | Sant'Anselmo et al. | |
| 5,128,528 | 7/1992 | Heninger | |
| 5,168,147 | 12/1992 | Bloomberg | 235/494 |
| 5,189,292 | 2/1993 | Batterman | 235/494 |
| 5,360,968 | 11/1994 | Scott | 235/456 |

FOREIGN PATENT DOCUMENTS 2 218 240  11/1989  United Kingdom.

*Primary Examiner*—Donald T. Hajec
*Assistant Examiner*—Mark Tremblay
*Attorney, Agent, or Firm*—Cushman Darby & Cushman IP Group of Pillsbury Madison & Sutro, LLP

[57] ABSTRACT

An apparatus for identifying a component (10) carrying a dot matrix code comprises a lamp (14) illuminating the dot matrix code, a video camera (18) for reading the illuminated dot matrix code. A computer (20) has an image grabber card (22) to produce a digitized image of the dot matrix code. The personal computer (20) has algorithms (24, 26, 28, 30 and 32) to measure the distances between every dot located in the digitized image, to determine the fundamental inter dot spacing (D). The dots separated by the fundamental inter dot spacing (D) lie in rows and columns of the dot matrix code. There are means to determine the angles ($\beta$ and $\alpha$) between the dots which are in the rows and columns and a camera datum. There are means to determine the orientation and location of the dot matrix code from the angles ($\beta$ and $\alpha$).

16 Claims, 3 Drawing Sheets

D = FUNDAMENTAL DISTANCE
a = D
b = 2D
c = 3D
d = 1.414D
e = 2.828D

METHOD AND APPARATUS FOR IDENTIFYING THE ORIENTATION OF A DOT MATRIX CODE MARKING OF AN ARTICLE

This application claims benefit of international application PCT/GB 95/00572, filed Mar. 16, 1995.

FIELD OF THE INVENTION

The present invention relates to a method and apparatus for identifying the orientation of a dot matrix code marking of an article.

BACKGROUND OF THE INVENTION

It is often required for components to be individually identified as they pass through a series of manufacturing stages so that a history of their manufacture is available for reference. One known method of identification is disclosed in our UK Patent No 2201808.

These components or workpieces are conveniently provided with a dot matrix identification marking and one dot matrix is read using an optical reader. The dot matrix code marking comprises a plurality of rows and columns on which dots comprising the code marking are located. The reader produces an output which is converted into a digital form by a processor. A further processor is provided to determine the orientation and position of the dot matrix code from the digitised image. The further processor worked by calculating the outer borders of the dot matrix code from the individual dots in the digitised image. This means that the edge of the dot matrix code has to have a reasonable number of dots along it, and each dot must be accurately located. However, not all dot matrix codes meet these requirements because the edges of some dot matrix codes have very few dots and in some cases the image processing performed to locate the dots is insufficient to locate all the dots. These two factors combine to cause the attempt to determine the orientation and position of the dot matrix code to fail in many instances.

SUMMARY OF THE INVENTION

The present invention seeks to provide a method and apparatus for identifying the orientation of a dot matrix marking of an article more easily.

Accordingly the present invention provides a method of identifying the orientation of a dot matrix code marking of an article relative to a datum, the dot matrix code marking having a plurality of rows and columns on which dots comprising the code marking are located, the method comprising (a) producing a digitised image of the dot matrix code, (b) measuring the distances between every dot located in the digitised image, (c) determining the fundamental inter dot spacing, dots separated by the fundamental inter dot spacing are located in the same row or column, (d) determining the angle between the dots in one of the rows and the datum, (e) determining the angle between the dots in one of the columns and the datum, (f) determining the orientation of the dot matrix code marking of the article from the said angles.

Preferably producing the digitised image comprises viewing the dot matrix code.

Preferably producing the digitised image comprises illuminating the dot matrix code.

Preferably the digitised image of the dot matrix code is stored in a store, machining the component, and remarking the component in accordance with the digitised image of the dot matrix code in the store. Preferably the centre of each dot in the digitised image is located. Preferably a histogram of the distances between every dot located in the digitised image is produced and the fundamental inter dot spacing is determined from the histogram.

The present invention also provides an apparatus for identifying the orientation of a dot matrix code marking of an article relative to a datum, the dot matrix code marking having a plurality of rows and columns on which dots comprising the code marking are located, the image apparatus comprising means to produce a digitised of the dot matrix code, means to measure the distances between every dot located in the digitised image, means to determine the fundamental inter dot spacing, the dots separated by the fundamental inter dot spacing are located in the same row or column, means to determine the angle between the dots in one of the rows and the datum, means to determine the angle between the dots in one of the columns and the datum, means to determine the orientation of the dot matrix code marking of the article from the said angles.

Preferably the means to produce a digitised image comprises means to view the dot matrix code.

Preferably the means to produce a digitised image comprises means to illuminate the dot matrix code.

Preferably there is means to store the digitised image of the dot matrix code, means to machine the component, and means to remark the component in accordance with the digitised image of the dot matrix code in the store means.

Preferably the means for reading comprises a video camera.

Preferably the camera is a CCD camera.

Preferably the illuminating means is arranged to direct the light at a low angle of incidence to the dot matrix code on the component.

Preferably a display is provided to indicate whether the orientation and location of the dot matrix code has been achieved.

Preferably means are provided to locate the centre of each dot in the digitised image.

Preferably means are provided to produce a histogram of the distances between every dot located in the digitised image, the means to determine the fundamental inter dot spacing uses the histogram produced by the means to produce the histogram.

Preferably means are provided to locate the centre of each dot in the digitised image.

Preferably means are provided to produce a histogram of the distances between every dot located in the digitised image, the means to determine the fundamental inter dot spacing uses the histogram produced by the means to produce the histogram.

BRIEF DESCRIPTION OF THE DRAWINGS

The present invention will be described more fully by way of example with reference to the accompanying drawings in which.

DETAILED DESCRIPTION OF THE INVENTION

Figure 1:
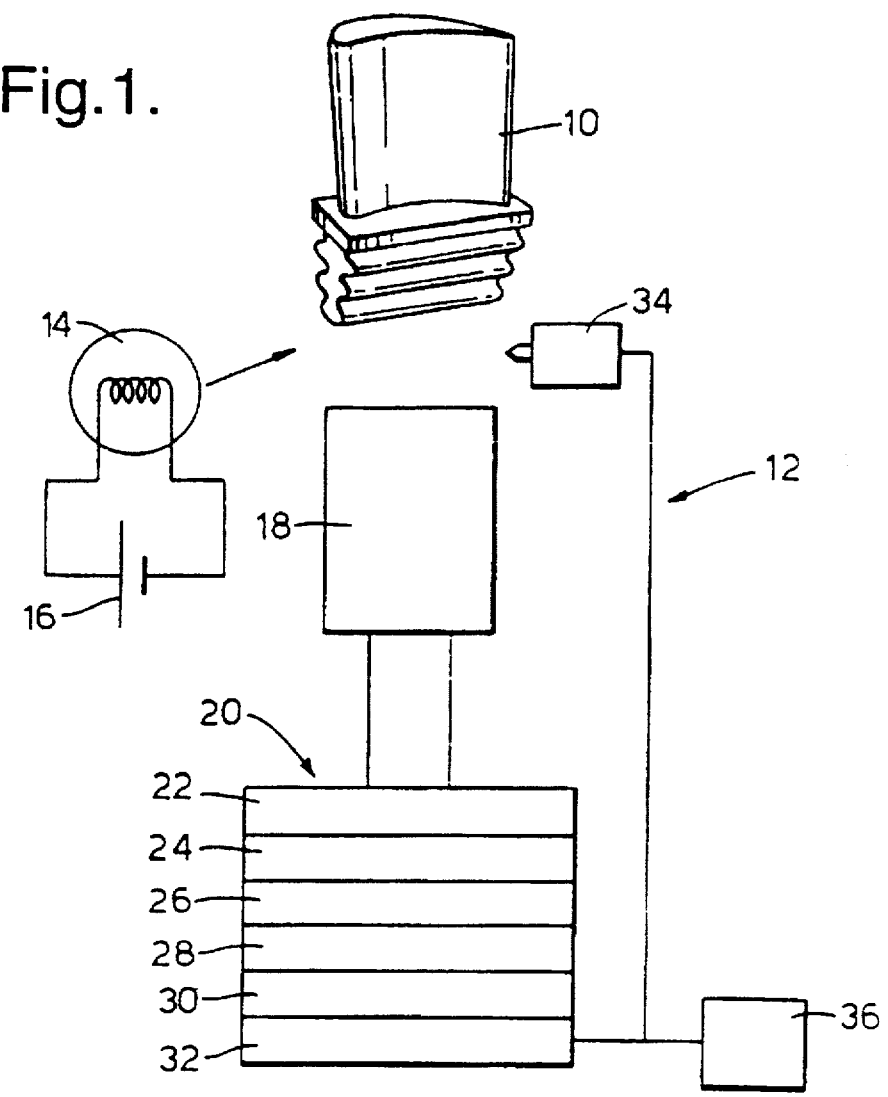
FIG. 1 is a schematic illustration of an apparatus according to the present invention.

An apparatus 12 for identifying the orientation of a dot matrix code marking of an article 10 comprises a lamp 14 for illuminating a pre-existing dot matrix code on the component 10, and a video camera 18, for example a CCD camera, for viewing the illuminated dot matrix code on the component 10. The lamp 14 is connected to a power supply 16 and is arranged to direct the light at a low angle of incidence to the surface of the component 10, to increase the contrast of the dots in the dot matrix code.

The video camera 18 produces an output signal corresponding to the dot matrix code on the component 10. The output signal is supplied to a personal computer 20 other suitable device which has an image grabber 22 card to produce a digitised image of the dot matrix code. The personal computer 20 has means 24 to locate the centre of each dot in the digitised image. The personal computer 20 has means 26 to measure the distances between every dot located in the digitised image. The personal computer has means 28 to produce a histogram of the distances between every dot located in the digitised image. The personal computer has means 30 to determine the fundamental inter dot spacing D from the histogram. The dots in the dot matrix code marking are generally arranged in rows and columns, usually the rows and columns are arranged perpendicular to each other, although it may be possible to arrange the rows and columns at other angles. The dots separated by the fundamental inter dot spacing D are in the same row X or column Y. The angle α between one of the rows X and one of the columns Y is assumed to be 90°, although it may be another suitable angle. The personal computer has means 32 to determine the angles β and γ between the dots which are in the rows X and columns Y respectively of the dot matrix code and the camera horizontal column Z, and this enables the orientation and location of the dot matrix code to be determined.

Thus the personal computer is provided with means to analyse the digitised image of the dot matrix code. The means preferably comprises algorithms in the form of software.

The steps in the process are that the approximate centre of each dot in the digitised image is located. The distances between every dot located in the digitised image is measured, and then a histogram of these distances is produced. The histogram is processed to remove the low level peaks that result from badly marked dots or noise introduced by the image processing stage. The fundamental inter dot spacing D is determined from the histogram. The angle α between the dots which are separated by this fundamental distance D is known to be 90° or other suitable angle. The angles a corresponds to the separation between the rows and columns X and Y respectively of the dot matrix code. The angle β between the rows X and the camera horizontal datum Z is measured and the angle γ between the columns Y and the camera horizontal datum Z is measured. A bounding rectangle is then fitted to the dot matrix code by rotating it around and scaling it using the fundamental inter dot spacing D obtained from the histogram.

Figure 2A:
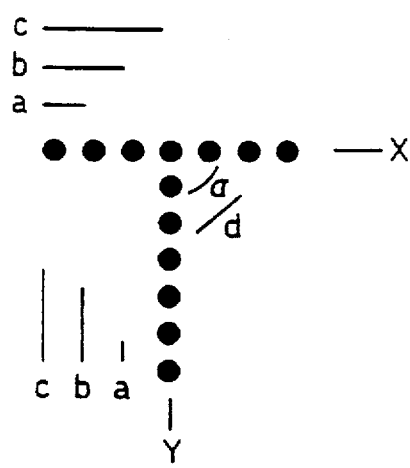
FIGS. 2A–2C are diagrams of inter dot distances.
Figure 2B:
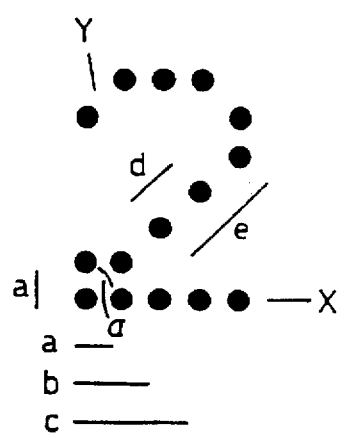
Figure 2C:
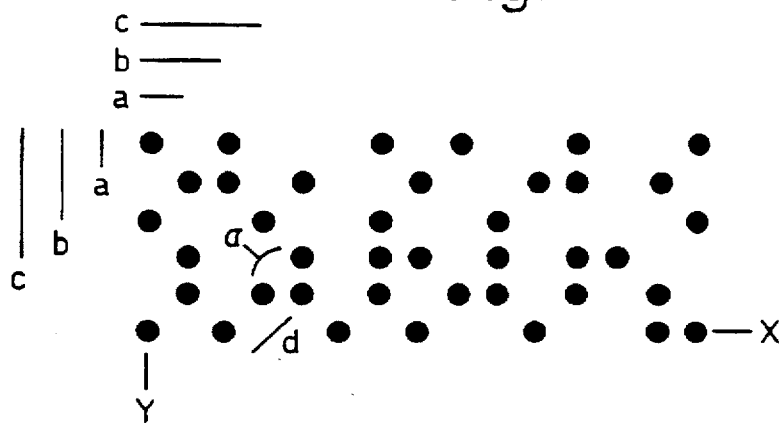

FIGS. 2A to 2C show three typical dot matrix codes. The figures also show common distances within the dot matrix codes, and D is the fundamental inter dot space and other inter dot spacings a, b, c d and e are shown for these dot matrix codes. The dots separated by the fundamental inter dot spacing D are in the same row X or the same column Y. The angle α between the rows and columns X and Y is assumed to be 90° as mentioned above.

Figure 3:
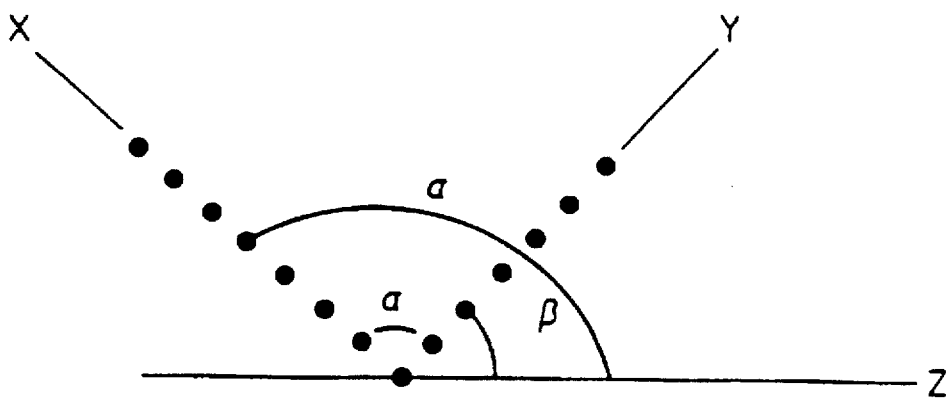
FIG. 3 is a diagram of a camera image.

FIG. 3 indicates one possible camera image. The rows and columns X, Y are separated from the horizontal camera datum Z by angles β and γ respectively.

Figure 4:
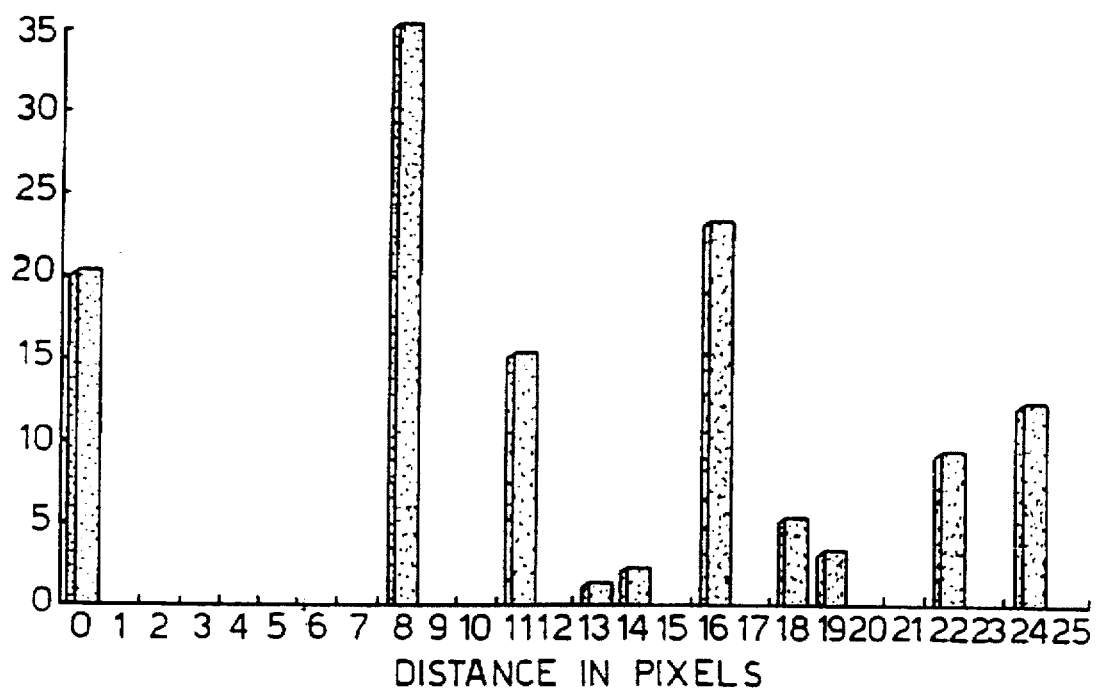
FIG. 4 is a histogram of inter dot distances.

FIG. 4 is a typical histogram of inter dot spaces for a dot matrix code. The histogram is for a dot matrix code with a fundamental inter dot space of 8 pixels. This gives rise to peaks at 0, 8, 16, 24, 11.3 and 22.6. The algorithm checks for those peaks to confirm its choice of fundamental inter dot spacing distance. This check means that results from other marks and noise from the image processing do not affect the final result.

A dot marking machine 34 is also provided to remark the component 10 if machining processes which are performed on the component 10 remove the dot matrix code.

Also a display 36 is provided to indicate whether the orientation and location of the dot matrix code has been achieved. The display 36 may be a lamp which lights if the orientation and location has been achieved or different coloured lamps to indicate success or failure.

The apparatus may be used for any dot matrix code without knowledge of its outer dimensions or inter dot spacing. The apparatus does not require as high a quality of input data as required by the prior art discussed at page 1.

The invention uses the fundamental inter dot spacing which is a constant fixed by the marking machine rather than the outer edges and dimensions of the dot matrix code. This makes more information available for processing and hence the result is easier to obtain.

Although a camera horizontal datum has been used other suitable camera datums may be used for example a camera vertical datum.

What is claimed is:

1. The method of identifying the orientation of a dot matrix code marking of an article relative to a datum (Z), the dot matrix code marking having a plurality of rows and columns on which dots comprising the code marking are located, the method comprising:

(a) producing a digitized image of the dot matrix code, (b) measuring the distances between each dot located in the digitised image, and every other dot located in the digitised image, (c) determining the fundamental inter dot spacing wherein dots separated by the fundamental inter dot spacing are located in the same row or column, (d) determining the angle between a line joining the dots in one of the rows and the datum (Z), (e) determining the angle between a line joining the dots in one of the columns and the datum (Z), (f) determining the orientation of the dot matrix code marking of the article from the said angles.

2. A method as claimed in claim 1 wherein producing the digitised image comprises viewing the dot matrix code.

3. A method as claimed in claim 2 wherein producing the digitised image comprises illuminating the dot matrix code.

4. A method as claimed in claim 3 wherein the digitised image of the dot matrix code is stored in a store, machining the component, and remarking the component in accordance with the digitised image of the dot matrix code in the store.

5. A method as claimed in claim 4 comprising locating the centres of each dot in the digitised image.

6. A method as claimed in claim 5 comprising producing a histogram of the distances between every dot located in the digitised image, and determining the fundamental inter dot spacing from the histogram.

7. An apparatus for identifying the orientation of a dot matrix code marking of an article relative to a datum (Z), the dot matrix code marking having a plurality of rows (X) and columns (Y) on which dots comprising the code marking are located, the apparatus comprising means to produce a digitized image of the dot matrix code characterized by means to measure the distances between each dot located in the digitised image and every other dot located in the digitised image, means to determine the fundamental inter dot spacing wherein dots separated by the fundamental inter dot spacing (D) are located in the same row (X) or column (Y), means to determine the angle (β) between a line joining the dots in one of the rows (X) and the datum (Z), means to determine the angle (γ) between a line joining the dots in one of the columns (Y) and the datum (Z), means to determine the angle between a line joining the dots in one of the columns and the datum, means to determine the orientation of the dot matrix code marking of the article from the said angles.

8. An apparatus as claimed in claim 7 in which the means to produce a digitised image comprises means to view the dot matrix code.

9. An apparatus as claimed in claim 8 in which the means to produce a digitised image comprises means to illuminate the dot matrix code.

10. An apparatus as claimed in claim 9 comprising means to store the digitised image of the dot matrix code, means to machine the component, and means to remark the component in accordance with the digitised image of the dot matrix code in the store means.

11. An apparatus as claimed in claim 8 in which the means to view the dot matrix code comprises a video camera.

12. An apparatus as claimed in claim 11 in which the camera is a CCD camera.

13. An apparatus as claimed in claim 9 in which the means to illuminate the dot matrix code is arranged to direct the light at a low angle of incidence to the dot matrix code on the component.

14. An apparatus as claimed in claim 13 in which a display is provided to indicate whether the orientation and location of the dot matrix code has been achieved.

15. An apparatus as claimed in claim 14 comprising means to locate the centre of each dot in the digitised image.

16. An apparatus as claimed in claim 15 comprising means to produce a histogram of the distances between every dot located in the digitised image, the means to determine the fundamental inter dot spacing (D) uses the histogram produced by the means to produce the histogram.

* * * * *